(12) United States Patent
Jackson, Jr. et al.

(10) Patent No.: US 10,121,111 B2
(45) Date of Patent: Nov. 6, 2018

(54) COORDINATING CONTENDING RESOURCES

(75) Inventors: Philip Chilton Jackson, Jr., Troy, MI (US); Frank McPherson, West Bloomfield, MI (US); Katherine Tetreault, Shelby Township, MI (US)

(73) Assignee: Ent. Services Development Corporation LP, Houston, TX (US)

( * ) Notice: Subject to any disclaimer, the term of this patent is extended or adjusted under 35 U.S.C. 154(b) by 1462 days.

(21) Appl. No.: 13/208,316

(22) Filed: Aug. 11, 2011

(65) Prior Publication Data

US 2013/0041708 A1    Feb. 14, 2013

(51) Int. Cl.
G06Q 10/06    (2012.01)
G06Q 10/00    (2012.01)

(52) U.S. Cl.
CPC ................ *G06Q 10/0631* (2013.01)

(58) Field of Classification Search
CPC ...................................... G06Q 10/06
USPC ......................................... 705/1–44
See application file for complete search history.

(56) References Cited

U.S. PATENT DOCUMENTS 7,316,020 B2 * 1/2008 Raja et al. .................... 718/104
2004/0244001 A1 * 12/2004 Haller et al. .................. 718/100

OTHER PUBLICATIONS

Tony Sintes, Hashtables, Jun. 21, 2002, Javaworld, 1-4.*
"Array." Merriam-Webster Online Dictionary. 2013. Merriam-Webster Online. Feb. 6, 2013 </web/20090426090839/http://www.merriam-webster.com/dictionary/array>.*
Ali Godsi, Distributed k-ary System: Algorithms for Distributed Hash Tables, 2006, all pages (Year: 2006).*

* cited by examiner

*Primary Examiner* — Beth V Boswell
*Assistant Examiner* — Zahra Elkassabgi
(74) *Attorney, Agent, or Firm* — Sheppard Mullin Richter & Hampton LLP (57) ABSTRACT

Systems and methods of coordinating contending resources are disclosed. An example of a method includes analyzing information for activities, resources, and usage of the resources for the activities. The method also includes outputting a description of resource utilization by the activities in a time window, the description of resource utilization coordinating contending resources.

19 Claims, 6 Drawing Sheets

| | Day1 | Day2 | Day3 | Day4 | Day5 | Day6 | Day7 | Day8 | Day9 | Day10 | Day11 | Day12 | Day13 |
|---|---|---|---|---|---|---|---|---|---|---|---|---|---|
| Project 1 | 0.50 | 0.50 | 0.50 | 0.50 | 0.50 | 0.50 | 0.50 | 0.50 | 0.50 | 0.50 | 0.50 | 0.50 | 0.50 |
| Project 2 | 0.50 | 0.50 | 0.50 | 0.50 | 0.50 | 0.50 | 0.50 | 0.50 | 0.50 | 0.50 | 0.50 | 1.65 | 1.65 |
| Project 3 | 0.99 | 0.99 | 0.99 | 0.99 | 0.99 | 0.99 | 0.99 | 0.99 | 0.99 | 0.99 | 1.56 | 1.61 | 1.65 |
| Project 4 | 0.99 | 0.99 | 0.99 | 0.99 | 0.99 | 0.99 | 0.99 | 0.99 | 0.99 | 0.99 | 1.56 | 1.61 | 1.65 |
| Project 5 | 0.50 | 0.50 | 0.50 | 0.50 | 0.50 | 0.50 | 0.50 | 0.50 | 0.50 | 0.50 | 0.50 | 0.50 | 0.50 |
| Project 6 | 0.37 | 0.37 | 0.37 | 0.37 | 0.37 | 0.37 | 0.37 | 0.37 | 0.37 | 0.41 | 0.41 | 0.41 | 0.26 |

310

| Lt Green | Yellow | Red |

Fig. 3C

| Resource Name | Issue Start Date | Issue End Date | Relative Total Usage | Total Supply | Total Usage | Enterprise Code | Work Name | Task Name | Activity Usage |
|---|---|---|---|---|---|---|---|---|---|
| ATP Support | 8/1/2009 | 12/31/2009 | 3 | | 3 | BAU | CARS Umbrella | Umbrella | 3 |
| Bianucci, Romina | 9/1/2009 | 9/30/2009 | 1.28 | 1 | 1.28 | BAU | CUP DM | CID | 0.25 |
| Bianucci, Romina | 9/1/2009 | 9/30/2009 | 1.28 | 1 | 1.28 | BAU | CARS E157 | CID | 0.75 |
| Bianucci, Romina | 9/1/2009 | 9/30/2009 | 1.28 | 1 | 1.28 | BHC | CARS E211 | CID | 0.03 |
| Bianucci, Romina | 9/1/2009 | 9/30/2009 | 1.28 | 1 | 1.28 | BHC | DM E232 | CID | 0.25 |
| Eldred, Gary | 8/1/2009 | 12/31/2009 | 1.25 | 1 | 1.25 | BAU | CARS Umbrella | Umbrella | 0.25 |
| Eldred, Gary | 8/1/2009 | 12/31/2009 | 1.25 | 1 | 1.25 | BAU | ASE OSCAR Legac | CID | 1 |
| Ewry, Sharon | 9/1/2009 | 9/30/2009 | 1.56 | 1 | 1.56 | BAU | CUP DM | CID | 1.25 |
| Ewry, Sharon | 9/1/2009 | 9/30/2009 | 1.56 | 1 | 1.56 | BAU | CARS Umbrella | Umbrella | 0.03 |
| Ewry, Sharon | 9/1/2009 | 9/30/2009 | 1.56 | 1 | 1.56 | BHC | CARS E211 | CID | 0.03 |
| Ewry, Sharon | 9/1/2009 | 9/30/2009 | 1.56 | 1 | 1.56 | BAU | DM E232 | CID | 0.25 |
| Ewry, Sharon | 10/1/2009 | 10/31/2009 | 1.66 | 1 | 1.66 | BAU | CUP DM | CID | 1.25 |
| Ewry, Sharon | 10/1/2009 | 10/31/2009 | 1.66 | 1 | 1.66 | BAU | CARS Umbrella | Umbrella | 0.13 |
| Ewry, Sharon | 10/1/2009 | 10/31/2009 | 1.66 | 1 | 1.66 | BHC | CARS E211 | CID | 0.03 |
| Ewry, Sharon | 10/1/2009 | 10/31/2009 | 1.66 | 1 | 1.66 | BAU | DM E232 | CID | 0.25 |
| Hart, Bobby | 9/1/2009 | 9/30/2009 | 1.23 | 1 | 1.23 | BAU | CUP Phase 2 | CID | 0.05 |
| Hart, Bobby | 9/1/2009 | 9/30/2009 | 1.23 | 1 | 1.23 | BAU | CARS Umbrella | Umbrella | 0.43 |
| Hart, Bobby | 9/1/2009 | 9/30/2009 | 1.23 | 1 | 1.23 | BHC | CARS E211 | CID | 0.75 |
| Hart, Bobby | 11/1/2009 | 11/30/2009 | 1.18 | 1 | 1.18 | BAU | CARS E105 | CID | 0.5 |
| Hart, Bobby | 11/1/2009 | 11/30/2009 | 1.18 | 1 | 1.18 | BAU | CARS Umbrella | Umbrella | 0.43 |
| Hart, Bobby | 11/1/2009 | 11/30/2009 | 1.18 | 1 | 1.18 | BAU | ASE OSCAR Legac | CID | 0.15 |
| Hart, Bobby | 11/1/2009 | 11/30/2009 | 1.18 | 1 | 1.18 | BHC | CARS E211 | CID | 0.1 |

COORDINATING CONTENDING RESOURCES

BACKGROUND

Large enterprises often encounter situations where many projects compete for limited resources. The resources may include people, computing systems, and services, to name only a few examples. Resource management often needs to be addressed in a time-sensitive context to permit successful completion of projects in a cost-effective manner to satisfy the customer. The problem this presents is how to flexibly represent and efficiently manage resource contention involving large numbers of resources and projects utilizing these resources. Typically, this is a problem poorly solved at the enterprise level, and often results in sub-optimal, ad-hoc solutions implemented at the individual project level.

By way of illustration, a manager planning a project is already familiar with the experience of various employees within his or her group. The manager may meet with those employees, or a subgroup of these employees, to get an idea of their familiarity with the proposed project, their current workload, and their availability to take on another project. The manager may then assign those employees having sufficient capability and availability to work on the project. This process encounters resource contention problems when many managers need to coordinate many of the same employees across many different projects, and need to develop workable plans for projects far in advance, avoiding resource conflicts. To address such problems, managers turn to computer software tools for project planning.

Some software tools support basic project management. But in general, such tools are limited to being able to handle a single project (or at most a few projects) which can be manually modeled using the tool. These tools are also limited to modeling a one or a few types of resource for the project, such as, human resources. These existing tools do not support scheduling of many resources across many different projects.

BRIEF DESCRIPTION OF THE DRAWINGS

FIGS. 3A-C shows example output as project-level resource views of contending resources.

DETAILED DESCRIPTION

A system and method is described for efficient analysis of large-scale resource contention across both project and non-project activities within an enterprise. An example system includes program code executable to analyze input information for activities, resources, and usage of the resources for the activities. The program code is also executable to generate an output description of resource utilization by the activities in a time window. The description of resource utilization may be used for coordinating contending resources.

Resource contention may be identified by analyzing information provided by various data sources. Data sources may include flat files, databases, such as but not limited to, human resource databases, accounting/cost databases, equipment databases, and/or other inventory databases. Information may include routine input, and may also include custom input or user-generated input. Custom input may include, but is not limited to, the relative importance of different projects, preferred participants, and participant familiarity with a customer.

In an example, the information may be grouped into domains (e.g., in terms of departments within the enterprise or other characteristic). Accordingly, domain-based rules may be used for the analysis, for example, to quantize resources that are available for particular projects, and/or to identify the potential for cross-domain sharing of resources.

Output from the analysis may be used to identify a likelihood of resource contention and help ensure that the resources are available for a particular project (or projects). The coordinating of resources depends on consideration of a variety of factors. Example factors may include scope of the project(s), available resources, ability of those resources to perform various functions, cost associated with utilizing resources, whether those resources are human or machines, and a number of other factors. A meaningful analysis of resource contention considers these and/or other factors. An analysis that incorporates some or all of these factors provides meaningful output for coordinating resource contention.

The system and method supports multiple different resources (e.g. people, compute resources, work environments, and services) and activities for a variety of users and enterprises. The system and method has no built-in limitations regarding the number of resources and/or activities that can be input and analyzed. For example, resource contention can be quickly identified and coordinated across many (e.g., hundreds of) projects involving many (e.g., thousands of) resources. The rapid identification of resource contention issues facilitates resolution in ways that enhance the ability of an enterprise to achieve project goals in a timely manner.

Although described herein with reference to enterprise activities, it should be understood that implementation for enterprises is but one example of coordinating resource contention. Other examples are also contemplated. For example, utilities (gas, electric, water) and government may use the systems and methods described herein to coordinate public services in view of limited resources.

Before continuing, it is noted that as used herein, the term "includes" means includes but not limited to, the term "including" means including but not limited to. The term "based on" means based at least in part on.

Figure 1:
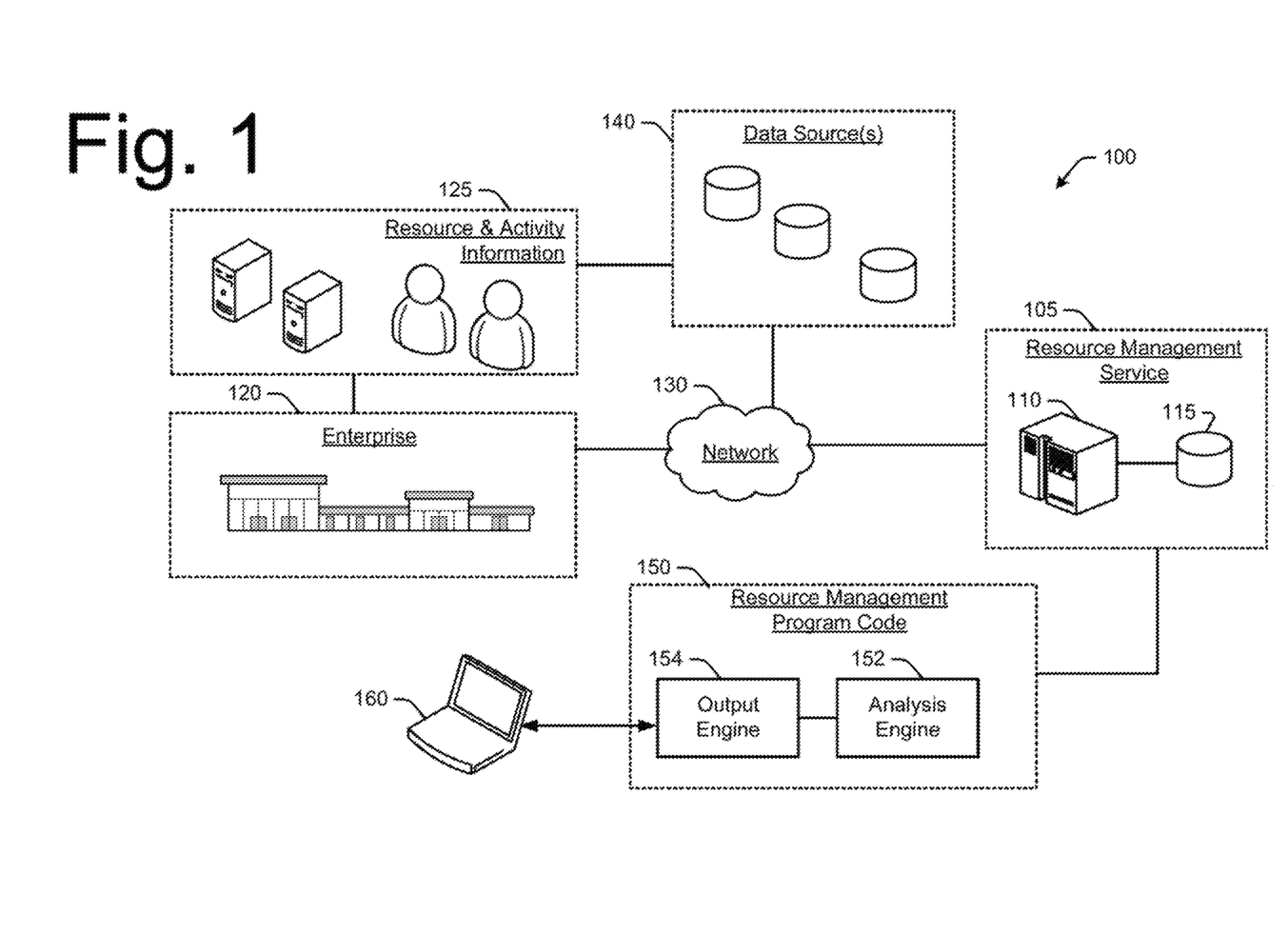
FIG. 1 is a high-level block-diagram of an example computer system which may be used for coordinating resource contention.

FIG. 1 is a high-level block-diagram of an example computer system 100 which may be used for coordinating resource contention. System 100 may be implemented with any of a wide variety of computing devices, such as, but not limited to, stand-alone desktop/laptop/netbook computers, workstations, server computers, blade servers, mobile devices, and appliances (e.g., devices dedicated to providing a service), to name only a few examples. Each of the computing devices may include memory, storage, and a degree of data processing capability at least sufficient to manage a communications connection either directly with one another or indirectly (e.g., via a network). At least one of the computing devices is also configured with sufficient processing capability to execute the program code described herein.

In an example, the system 100 may include a host 110 providing a resource management service 105 accessed by a user via a client device. For purposes of illustration, the service 105 may be a data processing service executing on a host 110 configured as a server computer with computer-readable storage 112. The client may be any suitable computer or computing device (e.g., a mobile device) capable of accessing the host 110. Host 110 and client are not limited to any particular type of devices. It is also possible for the host 110 and client to be the same device (e.g., a kiosk platform). Although, it is noted that the data structure operations described herein which may be executed by the host 110 are typically better performed on a separate computer system having more processing capability, such as a server computer or plurality of server computers. The user interface may be provided on any computing device for providing data to, and receiving data from, service 105. For example, the host may display the results requested by the user in a variety of visual representations and textual formats, depending on type of results, user preferences, client devices, network type and bandwidth.

The system 100 may also include a communication network 130, such as a local area network (LAN) and/or wide area network (WAN). In one example, the network 130 includes the Internet or other mobile communications network (e.g., a 3G or 4G mobile device network). Network 130 provides greater accessibility to the service 105 for use in distributed environments, for example, where more than one user may have input and/or receive output from the service 105.

In an example, the host 110 is implemented with (or as part of) the service 105 in the networked computer system 100. For example, the service 105 may be a cloud-based service, wherein the host 110 is at least one server computer in a cloud computing system. The host 110 may be provided on the network 130 via a communication connection, such as via an Internet service provider (ISP). In this regard, the client is able to access host 110 directly via the network 130, or via an agent, such as a network site. In an example, the agent may include a web portal on a third-party venue (e.g., a commercial Internet site), which facilitates a connection for one or more clients with host 110. In another example, portal icons may be provided (e.g., on third-party venues, pre-installed on a computer or mobile device, etc.) to facilitate a communications connection between the host 110 and client.

Before continuing, it is noted that the host 110 is not limited in function. The host 110 may also provide other services to other computing or data processing systems or devices in the system 100. For example, host 110 may also provide transaction processing services, email services, etc.

In addition, the resource management service 105 may be operable to communicate with at least one information source 140 for an enterprise 120. The source 140 may include any suitable source(s) for information 125 about various activities, resources, and usage of those resources for the activities of an enterprise 120. Accordingly, the source 140 may be part of the service 105, part of the enterprise 120, distributed in the network 130, and/or a combination thereof. For example, the source 140 may include public databases with public information, internal or private databases for the enterprise 120, other sources, and/or a combination of these. The source 140 may include automatically generated user input (e.g., from computer files) and/or may be manual user input via an appropriate interface with the resource management service 105. In addition, the information may include unprocessed or "raw" data. Or the data may undergo some level of processing. There is no predefined limit to the amount of information that may be provided by the source 140.

The resource management service 105 may execute analysis using the information 125 to generate output for coordinating resource contention. For example, the host 110 receives information from the source 140 including resources available for a particular activity. The host 110 may maintain the results in at least one data structure (e.g., a matrix or table or database) in computer-readable media 115. The data structure may be accessed by the host 110, which performs analysis based on information 125 and other input by the user, and outputs the results for the user. Example data structures which may be utilized are described in more detail below with reference to FIG. 2.

In an example, the resource management service 105 performs the analysis and generates the output described herein by executing resource management program code 150 at the host 110. An example architecture of machine readable instructions for the program code 150 may be implemented in machine-readable instructions (such as but not limited to, software or firmware) stored on a computer readable medium (e.g., storage 115) and executable by one or more processor (e.g., on host 110) to perform the operations described herein.

The program code 150 may perform operations on at least one data structure. The data structure may be provided on the same or different computer readable medium (e.g., storage 115). It is noted, however, that the components shown and described herein are provided only for purposes of illustration of an example operating environment, and are not intended to limit execution to any particular system.

During operation, the program code executes the function of the architecture of machine readable instructions as self-contained modules. These modules can be integrated within a self-standing tool, or may be implemented as agents that run on top of an existing database. In an example, the architecture may include an analysis engine or analyzer 152. The analyzer 152 accepts input data in tabular formats describing activities, resources, usages of resources by activities, and supplies of resources by activities. The analyzer 152 scans through the input data and builds data structures, using nested hash tables and arrays to describe utilization of multiple resources by multiple activities across a time window.

Without loss of generality, the data structures may be described to enable analysis of daily resource usage. The analysis may be applied at any desired time interval, e.g., hours, days, weeks, months, quarters, and years. The granularity of time for the analysis varies inversely with the time interval. That is, the smaller time intervals typically analyze data over more time, and thus use more memory for the analysis.

In terms of performance time, scalability and efficiency, the analysis is optimal (or near optimal) by relying on access methods that perform in near constant time (e.g., using the array accesses and hash tables). The use of nested hash tables and arrays provides fast, linearly scalable analysis of data structures describing utilization of multiple resources by multiple activities across a time window.

The output generated by an output engine 154 may include a view (e.g., in a user interface 160) that is displayed for the user over a window of time from the perspective of all resources, showing degrees of allocation for each resource. A project-level view over a window of time may show maximum allocation of all resources for a project on each date. The output is concise and clear, directly showing the user when resource contention occurs, and which projects are affected.

It is noted that the functional modules are shown for program code 150 for purposes of illustration. Still other functional modules may also be provided. In addition, the functional modules may be combined with one another.

By way of illustration, the program code 150 may also be executed to rate resources and/or activities. The resources and/or activities may be rated based on information in the database and/or information provided by the user. The ratings may also be weighted. For example, limited resources and/or higher priority activities may receive a higher weighting than more plentiful resources and/or lower priority activities.

It is also noted that the resource management service 105 may also be implemented to support other types of reusable, finite capacity resources. In addition to project-based resources such as human resources, computing environments (e.g., servers), work environments, examples also include non-project-based resources, such as government services, health services, etc. The systems and methods described herein are extensible to support analysis of resource contention for consumable resources (e.g., natural resources such as water, coal, oil, and gas), energy (e.g., electricity), building materials, and other commodities.). Analysis of resource contention for monetary resources may be considered either from the perspective of reusable resources (e.g. investments to be repaid) or consumable resources (e.g. spending allocation).

Figure 2:
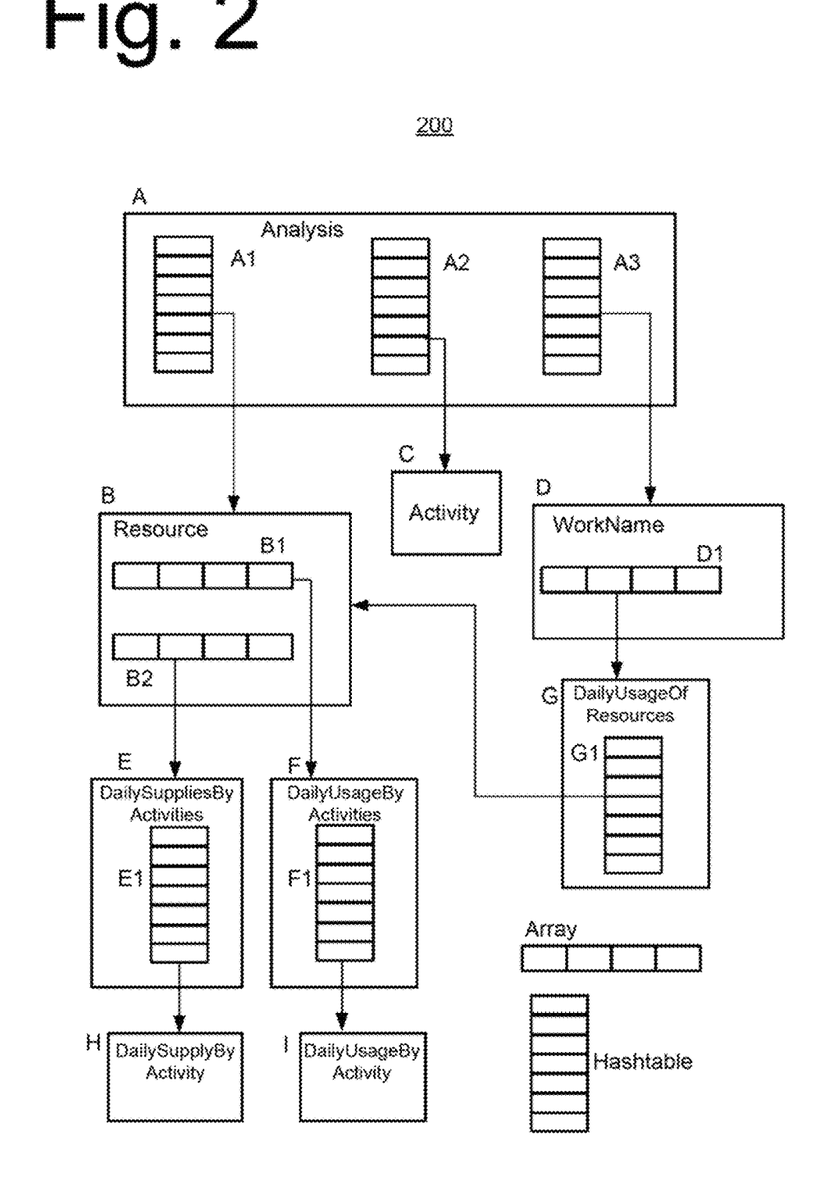
FIG. 2 illustrates operations on example data structures.

In an example, the program code may operate on multi-dimensional data structures. FIG. 2 illustrates operations on example data structures 200. The data structures are configured as arrays with information. Information is organized within the array and hashed for sorting, analysis, and output, as described with regard to the following example.

To begin, a user specifies parameters that affect analysis of resource contention, and the desired output or display of results. Example parameters include, but are not limited to, start date for analysis window, time span for analysis window, and a resource usage threshold. All parameters may have default values that the system may use if the user does not specify values for one or more parameters during use.

The values of the parameters may be stored in an analysis object A for use by the system. The analysis object A provides a starting location for data structures created by the system when the user starts the analysis.

The system reads input data files describing resources, for which resource contention are analyzed. For each resource described by the data, the system creates a resource object B. The system puts these resource objects into a hash table A1 in the analysis object, so that any resource can be found in constant time by specifying its unique identifier, regardless of the number of resources.

Each resource object B has two arrays B1 and B2. One array stores a DailySuppliesByActivities object E for each day in the analysis window. The other array stores a DailyUsagesByActivities object F for each day in the analysis window. Using these arrays, the system can find all the supplies or usages of that resource on any day, via a single array access in constant time.

The system reads input data files describing activities and worknames for which resource contention are analyzed. The term "workname" is used herein to refer to a collection of related tasks (e.g. a single project including multiple tasks). The term "activity" is used herein to refer to a specific task performed by a specific workname. Thus, an activity can be identified by the combination of a workname and a task name.

For each activity described in the input data files, the system creates an activity object C. The system puts these activity objects into a hash table A2 in the analysis object A. Accordingly, any activity object can be found in constant time regardless of the number of activities.

The system also creates a workname object D for each workname identified in the input data files. The system puts these workname objects into a hash table A3 in the analysis object A. Accordingly, any workname can be found in constant time regardless of number of worknames.

Each workname object has an array D1 that can store a DailyUsagesOfResources object G for each day in the analysis window. Accordingly, for any workname the system can find all the resources used by the workname on any day, via a single array access and in constant time.

The system reads input data files describing supplies of resources by activities and worknames. The data specifies a start and end date for each resource supply, and a numerical quantity for the level of resource supply.

For each resource supply, the system adds supply information for the activity supplying the resource, over the time span of the supply. For each date in the time span the system increments a TotalSupply array value in the resource object B. Also for each date in the time span, the system creates (or accesses, if already created) a DailySuppliesByActivities object E for that date. The system puts the DailySuppliesByActivities object into an array B2 so that this object can be found for the particular date in constant time.

A DailySuppliesByActivities object stores all supplies of a resource on a single day, by having a hash table E1 of DailySupplyByActivity objects H. The hash table enables the resource supply by a specific activity on the specific date to be found in constant time, regardless of the total number of activities or worknames.

Each DailySupplyByActivity object H holds information specifying the total supply of a specific resource by a specific activity, on a specific day. The system computes and increments this total supply as the objects are created and added into the hash table E1.

The system reads input data files describing resource usages by activities and worknames. The data specifies a start and end date for each resource usage, and a numerical quantity for the level of resource usage.

For the resource used in each resource usage, the system adds usage information for the activity using the resource, over the time span of the usage. For each date in the time span the system increments a TotalUsage array value in the resource object B. Also for each date in the time span, the system creates (or accesses if already created) a DailyUsagesByActivities object F for that date. The system puts the DailyUsagesByActivities object into an array B1 so that this object can be found for the particular date in constant time.

A DailyUsagesByActivities object stores all usages of a resource on a single day using a hash table F1 of DailyUsageByActivity objects I. The hash table enables the resource usage for a specific activity to be found in constant time, regardless of the total number of activities.

Each DailyUsageByActivity object holds information specifying the total usage of a specific resource by a specific activity, on a specific day. The system computes and increments total usage as the objects are created and added into the hash table F1.

Also for each date in the analysis time span, the system updates (or creates) a DailyUsagesOfResources object G for the workname D using the resource B on that date. The object G is placed in the array D1, so that all resources used by a workname for a particular time can be retrieved in a single array access in constant time. The hash table G1 enables direct access to each resource used by the workname for a particular time.

The system iterates through the workname objects D in the hash table A3. For each workname object, the system iterates through the array D1, retrieving the workname's DailyUsagesOfResources object G for each day in the analysis window time span.

For each DailyUsagesOfResources object G, the system iterates through the object's hash table G1 to retrieve each of the resource objects B used by the workname for a particular time. For each resource, the system accesses its TotalUsage array value on this date to determine the maximum usage level over all resources used by the workname on this date. The maximum usage level is stored in a MaxUsage array on the object D.

The system outputs analysis results, for example, to data files which can be further manipulated by the user, or to a graphical display. Without loss of generality, two examples of analysis results can be output. In the first example, the system iterates over all resources that were analyzed. For each resource, the system iterates over all days in the analysis window. For each day, the system outputs the total usage of the resource by all activities during that day. This enables the user to see at a glance if any resources exceed a total usage threshold, on any day (or other time window).

In the second example, the system iterates over all worknames that were analyzed. For each workname, the system iterates over all days in the analysis window. For each day, the system outputs the maximum usage for all resources used by this workname on this day. This enables the user to see at a glance if a workname depends on any resources that are over-utilized, on any day (or other time window).

The data structures created during the analysis are available to support user interactive data examination. For example, the data structure may be used to show the user all activities using a resource on a specified day. In another example, the data structure may be used to show all resources used by a workname on a specified day. In still another example, the data structure may be used to show all resources used by an activity on a specified day (or other time window).

The data structures may also be used to support user interactive generation of different reports. An example report may show each workname and the first date on which there will exist a resource contention issue. Examples of output are described in more detail below with reference to FIGS. 4A-C.

The data structures shown and described herein are examples of data structures that may be used. It is noted, however, that any suitable format for processing data may be utilized. By way of example, nodes and/or tree structures may be used instead of, or in addition to, the arrays described above.

It is readily appreciated from the above discussion that the systems and methods may be utilized to provide a quick assessment of a large amount of information for a wide variety of resources and activities, and with high accuracy. In this regard, the systems and methods described herein may be implemented as a resource assessment service. For example, the systems and methods may be used by enterprises seeking to efficiently schedule limited resources based at least in part on importance assigned various activities, and timelines for completing these activities. The systems and methods not only enable such enterprises to competitively schedule their own resources, but to also effectively utilize outside resources.

Figure 3A:
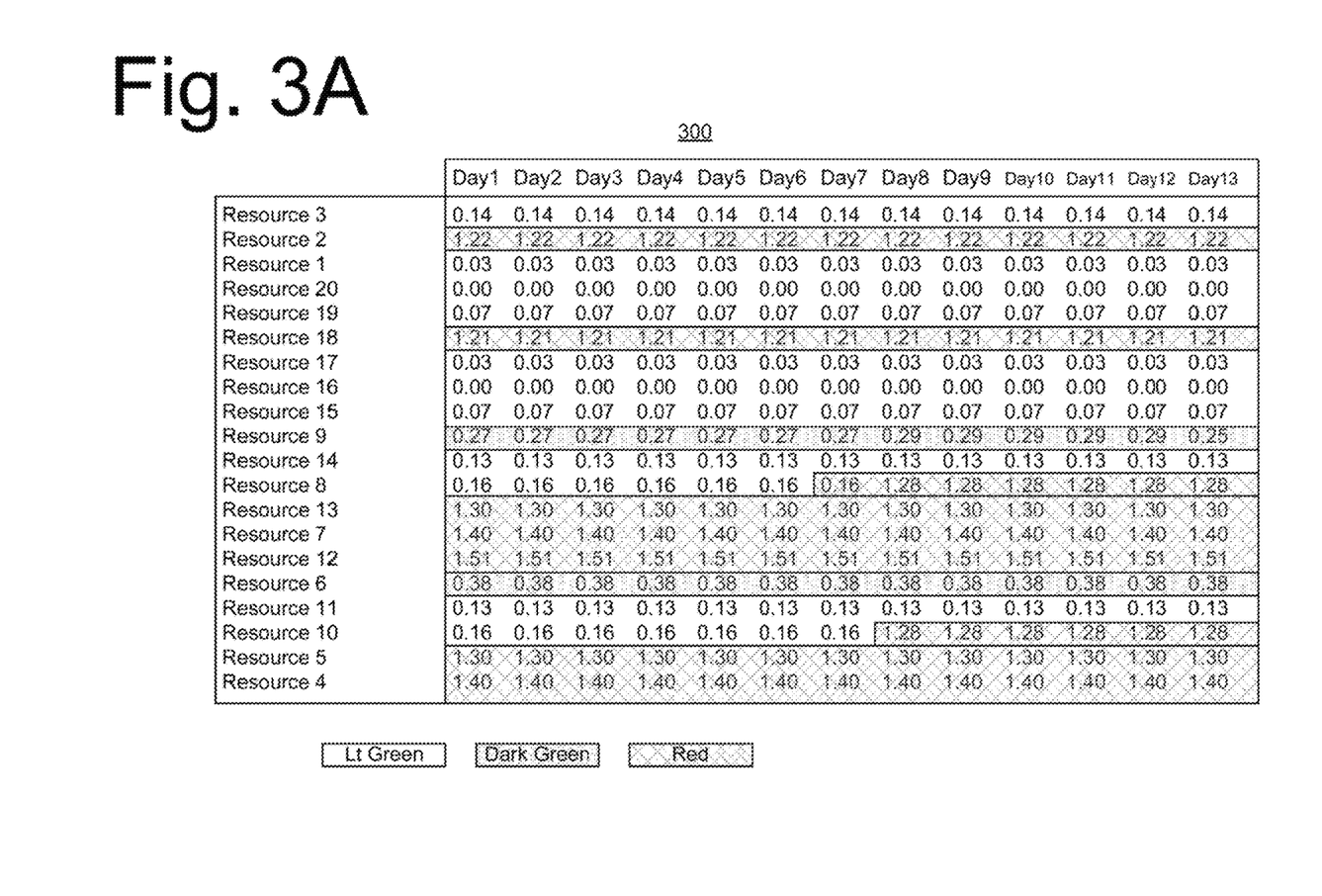
Figure 3B:
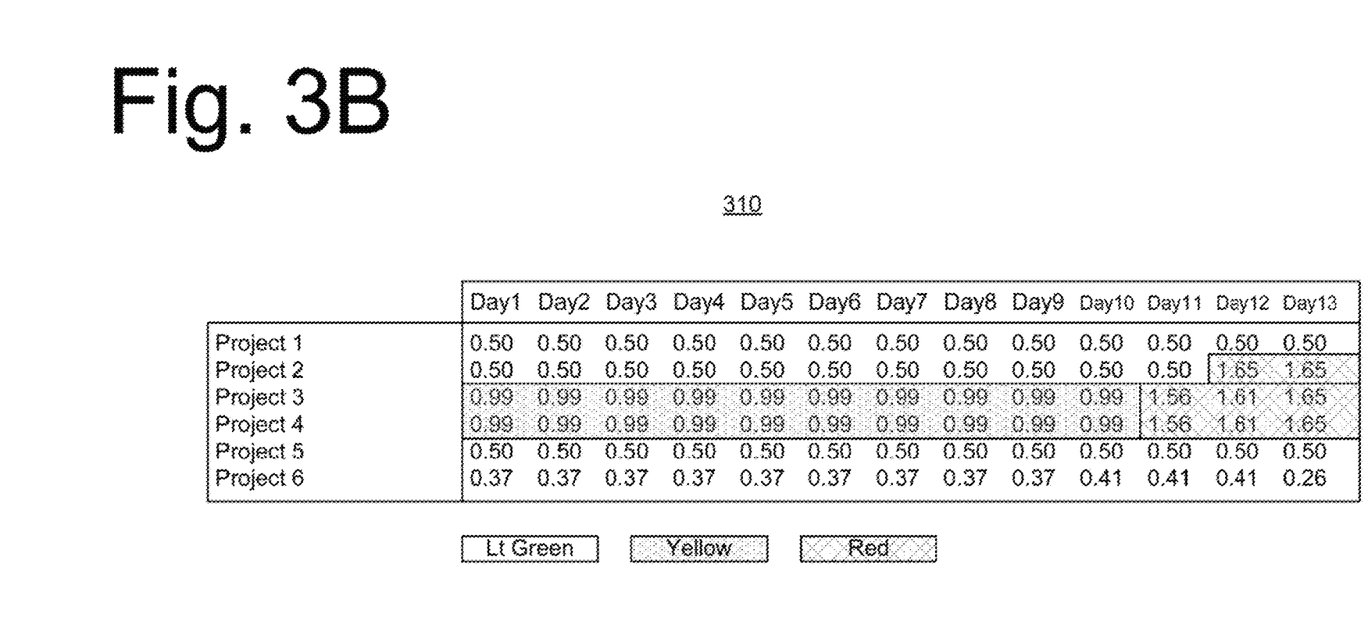

FIGS. 3A-C shows example output as project-level resource views of contending resources. FIG. 3A shows a resource level view 300. FIG. 3B shows a project level view 310. FIG. 3C shows a detailed issue report 320.

FIG. 3A is output 300 showing the level of usage for individual resources. The format shows a day-by-day usage of resources across a time window, summing all usages across multiple project and non-project activities. This output supports the user's investigation of resource contention issues, as may identified using resource views.

FIG. 3B is output 310, showing for each project, usage of any resources that the project depends on. The format shown is a day-by-day view across a time window. The user can consider all resource usages across multiple project and non-project activities. Thus, the user can see at a glance whether a project depends on any resources that are over-utilized, due to contention by multiple projects.

FIG. 3C shows a detailed issue report 320. For each over-utilized resource, the report shows Start and End Dates for all time periods when the resource is over-utilized. The report also shows total usage of the resource during each time period of over-utilization for worknames (e.g., projects) and tasknames that utilize the resource during each issue time period. The amount of utilization by each workname and taskname during each issue time period is also shown.

In an example, the system uses a threshold to automatically recognize when resources should be shown as over-utilized in the issue reports. If a resource has a relative total usage greater than or equal to this threshold, then the resource will be shown as over-utilized in the issue reports.

To determine time-periods of over-utilization, the system checks whether the relative total usage of a resource is the same on successive days. The report displays the worknames and tasknames for activities that use a resource on the first day of each time-period.

The output may also include an issue severity score. In an example, the issue severity score is a number indicating how severely the resource is over-utilized. The issue severity score is computed by summing the resource utilization for each day that the resource is over-utilized, during the analysis time window. Periods of over-utilization which ended before the report date are not included in the issue severity score.

In addition the output may automatically generate reports to show more detailed information about current and future resource contention issues, and across multiple projects in the enterprise. These reports may be used to identify issues based on an issue threshold, specified via the user interface.

A "thresholds" display (not shown) may be implemented to control how colds are used to display color-coded results. The user can change the threshold values for medium and high risk, to reflect what makes sense for the kind of resource usages you are analyzing.

This threshold operates independently of the criticality and usage thresholds that are used to filter display of information in resource views and workname views. This threshold does not affect the display of resource views and workname views. Likewise, the criticality and usage thresholds do not affect the generation of issue reports.

The output may also include a "what-if" analysis capability, that allows users to investigate alternatives for resolving resource conflicts. In an example, the user may change start dates and durations of projects and activities, change resource supply, and change usage levels for a project or activity. This provides a way for users to study options for "load-balancing" projects within the enterprise.

Before continuing, it should be noted that the examples described above are provided for purposes of illustration, and are not intended to be limiting. Other devices and/or device configurations may be utilized to carry out the operations described herein.

Figure 4:
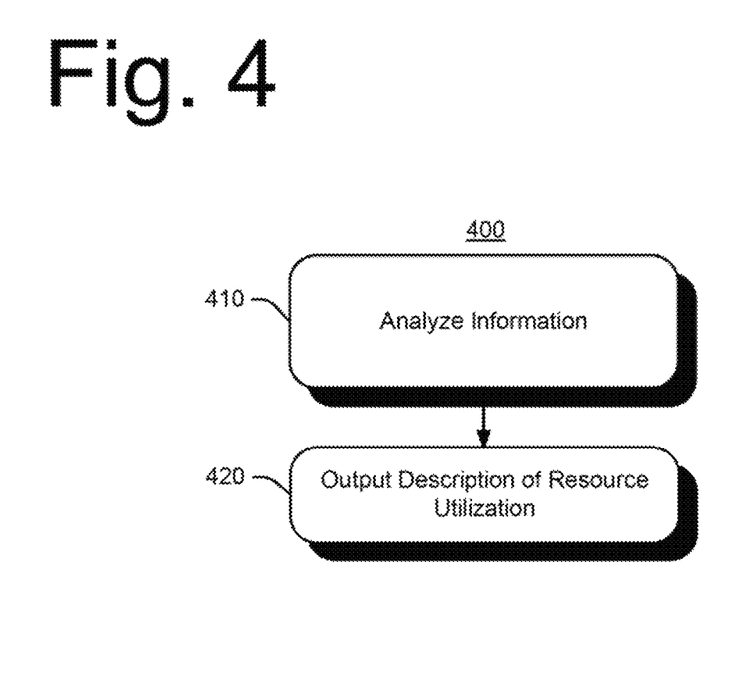
FIG. 4 is a flowchart illustrating example operations which may be implemented for coordinating contending resources.

FIG. 4 is a flowchart illustrating example operations which may be implemented for coordinating contending resources. Operations 500 may be embodied as machine readable instructions on one or more computer-readable medium. When executed on a processor, the instructions cause a general purpose computing device to be programmed as a special-purpose machine that implements the described operations. In an example implementation, the components and connections depicted in the figures may be used.

Operation 410 includes analyzing information for activities, resources, and usage of the resources for the activities. Operation 420 includes outputting a description of resource utilization by the activities in a time window, the description of resource utilization coordinating contending resources.

The operations discussed above are provided to illustrate various examples of determining node similarity. It is noted that the operations are not limited to the ordering shown. Still other operations may also be implemented.

For purposes of illustration, further operations may include analyzing user-described parameters, including at least a start date for the activities, and a resource usage threshold. Default values may be used for a portion of the information for unavailable user-described parameters.

Further operations may also include organizing the information as resource data and activity data. Other operations may include specifying a time window for resource availability. Still other operations may include coordinating the usage of the resources with the time window. Further operations may include describing supplies of the resources by activities and worknames. Still further operations may include iterating analyzing the usage of the resources over all of the resources available in the time window.

It is noted that various of the operations described herein may be automated or partially automated. For example, constructing data structures may be fully automatic using retrieval routines executed by program code. In another example, data structures may be constructed with at least some user interaction. The level of user interaction may be any suitable degree.

In an example, the operations may be implemented with an end-user interface (e.g., software or web-based interface). The end-user is able to make predetermined selections (e.g., specifying resources, activities, and/or time), and the operations described above are implemented on a back-end device to present the user with various calendaring views for coordinating contending resources. The user can then further select which of the alternatives best utilize available resources.

It is noted that the examples shown and described are provided for purposes of illustration and are not intended to be limiting. Still other embodiments are also contemplated.

The invention claimed is:

1. A method of coordinating contending resources, the method carried out by program code stored on non-transient computer-readable medium and executed by a processor, the method comprising:

analyzing by the executing program code, one or more input data files comprising information pertaining to activities, resources, and usage of the resources for the activities;

analyzing, by the executing program code, user-described parameters, including a start date of a time window for the activities and a resource usage threshold;

storing the user-described parameters in an analysis object, wherein the analysis object provides a starting location for a data structure;

storing, by the executing program code, a plurality of resource objects into a first hash table in the analysis object, each resource object being associated with a particular resource described in the one or more input data files;

storing, by the executing program code, a plurality of activity objects into a second hash table in the analysis object, each activity object being associated with a particular activity described in the one or more input data files;

storing, by the executing program code, a plurality of workname objects into a third hash table in the analysis object, each workname object being associated with a particular workname described in the one or more input data files;

outputting, by the executing program code, the data structure; and displaying, on a user interface of a user device, the data structure including allocation of the resources to the activities over a timespan of the time window, dates when contention of the resources occurs, and projects that are conflicted by the resource contention.

2. The method of claim 1, further comprising:
using default values for a portion of the information for unavailable user-described parameters.

3. The method of claim 1, further comprising organizing the information as resource data and activity data.

4. The method of claim 1, further comprising specifying a time window for resource availability.

5. The method of claim 4, further comprising coordinating the usage of the resources with the time window.

6. The method of claim 1, further comprising describing supplies of the resources by activities and worknames.

7. The method of claim 1, further comprising iterating analyzing the usage of the resources over all of the resources available in the time window.

8. The method of claim 1, further comprising reading input data files describing the resources, for which resource contention is analyzed, and for each described resource, creating a resource object, placing the resource object into a hash table in the analysis object, and assigning a unique identifier for each resource so that any resource can be found regardless of a number of the resources.

9. A system for coordinating contending resources, comprising:

a non-transitory computer readable storage to store information for activities, resources, and usage of the resources for the activities;

a processor to execute instructions stored in the non-transitory computer readable storage to:
analyze the information for activities, resources, and usage of the resources for the activities;
analyze user-described parameters, including a start date of a time window for the activities and a resource usage threshold;
store the user-described parameters in an analysis object, wherein the analysis object provides a starting location for a data structure;
store, by the executing program code, a plurality of resource objects into a first hash table in the analysis object, each resource object being associated with a particular resource described in the one or more input data files;

store, by the executing program code, a plurality of activity objects into a second hash table in the analysis object, each activity being associated with a particular activity described in the one or more input data file;

store, by the executing program code, a plurality of workname objects into a third hash table in the analysis object, each workname object being associated with a particular workname described in the one or more input data file; and output the data structure; and a user interface to display the data structure including allocation of the resources to the activities over a timespan of the time window, dates when contention of the resources occurs, and projects that are conflicted by the resource contention.

10. The system of claim 9, wherein the analysis object is to store values for the information and provide a starting location for analyzing the information for the resource contention.

11. The system of claim 9, wherein the displayed data structure further includes a workname object and a taskname object, wherein a combination of the workname object and the taskname object identify the activities.

12. The system of claim 9, wherein the displayed data structure further includes a workname object and an activity object describing resource supply.

13. The system of claim 9, wherein the processor is to iterate through each workname object in the data structure, and retrieve usage data for each of the workname objects in a predefined time.

14. The system of claim 9, wherein the processor is to determine maximum usage level over all resources for a predefined time.

15. The system of claim 9, wherein the displayed data structure further includes an output format showing a user if a workname depends on any over-utilized resources.

16. The system of claim 9, wherein the processor is to increment a total usage as activity objects are created for a corresponding resource.

17. The system of claim 9 further comprising an object storing all supplies of a corresponding resource for a predefined time.

18. A system to coordinate contending resources, the system include a non-transient computer readable storage medium to store program code, and a processor for executing the program code to:

analyze input information for activities, resources, and usage of the resources for the activities;

analyze user-described parameters, including a start date of a time window for the activities and a resource usage threshold;

store the user-described parameters in an analysis object, wherein the analysis object provides a starting location for a data structure;

store, by the executing program code, a plurality of resource objects into a first hash table in the analysis object, each resource object being associated with a particular resource described in the one or more input data files;

store, by the executing program code, a plurality of activity objects into a second hash table in the analysis object, each activity being associated with a particular activity described in the one or more input data file;

store, by the executing program code, a plurality of workname objects into a third hash table in the analysis object, each workname object being associated with a particular workname described in the one or more input data file;

generate the data structure; and display the data structure including allocation of the resources to the activities over a timespan of the time window, dates when contention of the resources occurs, and projects that are conflicted by the resource contention.

19. The system of claim 18, wherein the hash tables locate resource supply by a specific activity at a specific time to be found in approximately constant time, independent of total number of activities or worknames.

* * * * *